United States Patent [19]

Pinnow

[11] Patent Number: 4,665,397

[45] **Date of Patent: * May 12, 1987**

[54] APPARATUS AND METHOD FOR A UNIVERSAL ELECTRONIC LOCKING SYSTEM

[75] Inventor: Douglas A. Pinnow, Laguna Hills, Calif.

[73] Assignee: Universal Photonics, Inc., Laguna Hills, Calif.

[ * ] Notice: The portion of the term of this patent subsequent to Feb. 25, 2003 has been disclaimed.

[21] Appl. No.: 628,517

[22] Filed: Jul. 6, 1984

Related U.S. Application Data

[63] Continuation-in-part of Ser. No. 547,713, Nov. 1, 1983, Pat. No. 4,573,046.

[51] Int. Cl.[4] ........................ H04Q 9/00; E05B 49/00

[52] U.S. Cl. .......................... 340/825.56; 340/825.72; 361/172

[58] Field of Search ...................... 340/825.56, 825.31, 340/825.3, 825.71, 825.72; 455/186; 361/172; 358/194.1

[56] References Cited

U.S. PATENT DOCUMENTS

| | | | |
|---|---|---|---|
| 3,024,452 | 3/1962 | Leonard | 340/825.32 |
| 3,029,345 | 4/1962 | Douglas | 70/277 |
| 3,144,761 | 8/1964 | Lee | 70/277 |
| 3,872,435 | 3/1975 | Cestaro | 340/825.31 |
| 4,143,368 | 3/1979 | Route et al. | 340/543 |
| 4,189,712 | 2/1980 | Lemelson | 340/825.31 |
| 4,206,491 | 6/1980 | Ligman et al. | 361/172 |
| 4,218,681 | 8/1980 | Hormann | 455/603 |
| 4,250,533 | 2/1981 | Nelson | 361/172 |
| 4,325,146 | 4/1982 | Lennington | 455/604 |
| 4,348,744 | 9/1982 | White | 340/825.3 |
| 4,354,189 | 10/1982 | Lemelson | 340/825.31 |
| 4,392,133 | 7/1983 | Lundgren | 340/825.31 |
| 4,412,218 | 10/1983 | Niitsu | 340/825.56 |
| 4,412,356 | 10/1983 | Klaus et al. | 340/825.71 |
| 4,509,093 | 4/1985 | Stellberger | 340/825.31 |
| 4,510,623 | 4/1985 | Bonneau et al. | 455/186 |
| 4,596,985 | 6/1986 | Bongard et al. | 340/825.31 |

FOREIGN PATENT DOCUMENTS

| | | |
|---|---|---|
| 2016576 | 9/1979 | United Kingdom . |
| 2082804 | 3/1982 | United Kingdom . |

*Primary Examiner*—Donald J. Yusko

*Attorney, Agent, or Firm*—Bacon & Thomas

[57] ABSTRACT

An apparatus and method for providing a universal electronic locking system (UELS) which controls an actuating device for a lock is disclosed. The system is composed of two elements, a signal-transmitting unit and a signal-receiving unit. The integrated circuit chip of the watch is expanded to include a programmable memory unit such that various codes may be entered in the watch and the codes may be changed at any interval desired by the operator. The signal-receiving unit comprises a photodetector for receiving an optical signal from the signal-transmitting unit and contains a programmable memory unit which is responsive to each and all codes contained in the signal-transmitting unit. Upon changing the code signal in the signal-transmitting unit, the memory unit of the signal-receiving unit may be reprogrammed so as to be responsive to the newly encoded signal and allow the latching mechanism of the lock system to be operated. The system may be used alone or in combination with conventional key operated locking mechanisms. The UELS is contemplated for applications in the home, business, industry, recreation, defense and wherever locks and codes are used.

22 Claims, 13 Drawing Figures

APPARATUS AND METHOD FOR A UNIVERSAL ELECTRONIC LOCKING SYSTEM

CROSS REFERENCE TO RELATED APPLICATION

This application is a continuation-in-part of copending application Ser. No. 547,713, filed Nov. 1, 1983, now U.S. Pat. No. 4,573,046.

BACKGROUND OF THE INVENTION

The present invention relates to an apparatus and method for an electronic locking system. The system encompasses both a signal transmitting unit and a signal receiving unit for an electronically controlled and optically actuated locking system to replace the use of mechanical keys and mechanically controlled code locks such as combination locks. This invention recognizes that cost effective electronic and electro-optic components can be combined to make a locking system with reliability that exceeds that of purely mechanical locking devices. In addition, the storage of coded key information in a digital format within a portable solid state memory, which may be incorporated in a wrist watch or some similar device, is more convenient than actually carrying a set of keys. This locking system has universal application in home, business, recreation, defense, etc., wherever locks or codes are used.

Several previous systems are known which, through complexity of operation or bulk of transmitting and receiving units, fail to provide the flexibility and ease of operation of the present electronic locking system. Among the known prior art systems is U.S. Pat. No. 3,024,452 which discloses a multi-digit electric door lock. The system amounts to merely an electrical combination lock in which a plate is provided with a plurality of pushbuttons containing the digits zero through nine. After they are manually preset to a combination which will unlock the door, the pushbuttons may then at any time thereafter be actuated in succession with the three digit number to which they were manually preset so as to unlock the door by causing a solenoid to be temporarily energized.

U.S. Pat. No. 3,029,345 discloses an electronic key card system which requires a card B to be inserted in a slot of a control housing 12. In this system, each of the cards is provided with predetermined portions identified at reference numerals 20 and 21 to transmit light from one side of the control housing to the opposite side of the control housing which contains a photodetector circuit. If the predetermined portions of the control card B allow for the light to be transmitted therethrough, the system will unlatch a door lock controlled by a power source.

U.S. Pat. No. 3,144,761 discloses a lock release system which is operated by infrared radiation. The lock release system is manually operated by the rotation of a drive means 32 which moves a chopper disc which has a predetermined amount of material removed from various sections thereof. When the key device is placed to a window of a safe, the manual drive system 32 is rotated so as to move the chopper disc so that, during the movement, light passes through part of the cutaway disc. The output of the key is therefore a steady amount of infrared radiation which is interrupted by pulses. The detector, upon the receipt of a preset sequence of signals, unlocks the latching mechanism and allows entry to the safe. This system merely allows a constantly energized source of light to be interrupted by a manually rotated disc so as to sequence the light in a predetermined manner.

U.S. Pat. No. 3,872,435 discloses an opto-electronic security system wherein the key apparatus and the lock apparatus are precoded and which does not include an integral electrical power source. The lock device code is preset during the manufacture by hard wiring the components to transmit only a factory-assembled code.

U.S. Pat. No. 4,143,368 discloses a vehicle operator security system in which the driver of a vehicle carries a portable infrared signal generator which is actuatable to generate, selectively, at least two separate digitally coded infrared signals. The locking mechanism, contained in the vehicle, receives the signals, decodes them and actuates an apparatus in response to the first digital code so as to perform a first function such as unlocking a door to the vehicle. The second digital code is received so as to sound an alarm, upon actuation of the operator, at any time the operator perceives a reason for actuating the alarm. The transmitter unit of the locking system is provided with preset code storage means which contain a 14 bit identification code for four different switches. The code storage means are permanently contained in the transmitter.

U.S. Pat. No. 4,218,681 discloses a hand-held transmitter of the type that is well known for controlling the remote movement of garage door installations or like systems. The unit is provided with two different electromagnetic frequencies which can be transmitted as signals after a circuit-actuation pushbutton is turned on.

U.S. Pat. No. 4,325,146 discloses a non-synchronous object identification system which utilizes light-emitting diodes and detectors for supplying coded information to and receiving coded pulses from a device carried in the vehicle which is to be identified.

U.S. Pat. Nos. 4,354,189 and 4,189,712 relate to switch and lock activating systems and method. The patents are related as a continuation and contain the same disclosure. The disclosure relates to a system and method for opening a lock or activating a switch by electronically controlled devices. The device utilizes a finger ring which contains a code recording associated with the crown of the ring. Although the use of a watch is shown in conjunction with controlling a lock, it is to be noted that the watch is to be used in conjunction with a coded finger ring and therefore the codes, read by the lock actuating mechanism, are transmitted from the coded finger ring and the watch generates an energy field which is activated only when the ring is disposed within a cavity of the lock-actuating mechanism so that the code contained therein can be read.

SUMMARY OF THE INVENTION

The present invention relates to a method and apparatus for an electronic locking system which is designed to replace the typical key, card and mechanical combination locks that are well known in the present state of the art.

The system includes a signal transmitting unit and a signal receiving unit by which a light signal is transmitted to a light signal receiving unit for controlling the latching and unlatching of a lock mechanism. The light source may be programmed so as to transmit a coded optical signal through the air to an optical port in the signal receiving unit. The signal receiving unit is provided with a memory unit so as to match the received encoded optical signal with an encoded signal stored in the memory unit of the signal receiving means. A specific feature of the present invention is the elimination of separate and distinct lock operating mechanisms for each lock device. It is contemplated that the signal transmitting unit would be incorporated in a wrist worn device and specifically an electronic wristwatch of the type which utilizes a power source to energize a silicon integrated circuit chip of the type that normally appears in such electronic wristwatches. Alternatively, the transmitter could be incorporated in a pocket, pendant, or pencil watch, etc. While transmitters may also be made in a form not combined in a watch, the invention recognizes the combination of the transmitter with a watch as a preferred embodiment. This is because certain components of the watch, such as the digital display and battery, can serve dual functions, as described in more detail below, for both telling time and opening locks or transmitting security codes.

The invention further contemplates that such a device be capable of transmitting a plurality of different encoded signals, each of which may be reset or reprogrammed so as to allow the coded signal to be changed whenever desired. This function could also be integrated into the integrated circuit chip for the watch and be controllable by additional function control buttons provided on the watch in addition to those that are normally required for resetting time, date, etc. The invention also recognizes the fact that the transmission of an encoded optical signal may be accomplished extremely efficiently for many operations without substantially draining the power source of the electronic wristwatch. An additional feature of the universal electronic locking system is that a single lock can be designed to be opened by a multiplicity of different codes. The memory unit of the signal receiving unit can store a large number of codes so that when a specific code is received by the photodetector of the signal receiving unit, a comparator-processor can compare this received code with all valid codes that have been entered in the memory unit of the signal receiving unit. Upon a match of codes, the latching mechanism of the locking system would be opened. This particular multi-code operation may be desirable for locks that are used by many people, for example, by members of a club to open the same lock at a shared clubhouse. Such a system would greatly reduce the number of code categories that are required on each individual's signal sending unit.

Of course, it is recognized that many desirable features can be added to or are a part of the universal electronic locking system. For example, the light source may either be a light emitting diode, a semiconductor laser diode or a super radiant light-emitting diode which has the characteristics intermediate between the light-emitting diode and the laser diode. Of course, it is understood that it is preferred to select the most energy efficient combination of power source and photodectector in the signal receiving unit so as to conserve battery power of the watch. In this regard, light-emitting diodes made from aluminum gallium arsenide, with the chemical formula $Al_xGa_{1-x}As$ with the value of x ranging between 0.0 and 0.4, are known to be the most efficient at converting electrical energy in a battery into light energy, and are therefore preferred. Silicon photodiodes are the preferred type of photodetector based on an excellent spectral match of their detectivity to the emission spectra of the aluminum gallium arsenide light emitter. In addition, the silicon photodiodes are inexpensive and are known to be highly reliable.

It is also recognized that the beam of infrared light emitted from the watch would be in the form of the relatively broad cone of light. Therefore, it may be desirable that the beam be somewhat more collimated by setting a lens in front of the light source.

Additionally, the optical port on the signal receiving unit should be covered with a protective window which is transparent to the infrared beam of the signal transmitting light source. To increase detection of the signal transmitted from the watch, an optical filter may be placed between the window and the photodetector of the signal receiving unit to reject all ambient light except the light in the emission band of the light source transmitting element. This would substantially improve the sensitivity of the photodetector element of the signal receiving unit by eliminating undesirable background light which would cause noise in the detected signal. During normall operation, the light source of the signal transmitting unit would not be activated by the operator until he was within arm's length of the lock. When the light source is activated, the beam would be aimed at the lock by line-of-sight with the eye. Since the light source is activated such a short distance away, this drastically reduces the light source drive power requirements and allows the unit to be utilized in a smaller housing, such as a watch.

The transmission code format for activating the light source is selected so as to be effective and efficient. An example of such a format would be to convert the six digit code into a binary bit sequence that is transmitted in a frequency shift key format. The transmission bit rate of either 9.6 kilobits per second or 56 kilobits per second would be convenient because both are standard transmission rates used broadly in telecommunications and computer interconnections.

Also, a protective delay feature could be introduced to the electronic processor in the lock so as to protect it from an unauthorized intrusion by a specifically designed transmission device that would rapidly sequence through all possible code combinations. This protective feature would require a delay of a predetermined time period after the signal-receiving unit received a predetermined number of unauthorized code combinations before it could be addressed again by an optical transmitter. Accordingly, this would make the time necessary to sequence through all the possible combinations excessively long.

The device also contemplates the use in vehicle applications including automobiles, earth moving equipment, firetrucks, aircraft (both commerical and military), and ships and boats, in which the electronic locks would be powered from the vehicle battery. Such a system would negate the need for separate ignition locks if the doors were always made to lock when shut when using the new universal electronic lock system. In the case of a dead battery, an electrical connector on the exterior of the vehicle could be utilized to receive a standard nine volt transistor battery which could be connected in the circuit so as to reactivate the lock.

For applications where there is more than one entry door, the natural redundancy of the system, when applied to each of the entrances, protects the user from being denied access in the event of a signal component failure in one of the locks. As an example, in apartments with a single entry door, special locks with redundant components could be designed so as to insure continued operation of the lock. The locking system is also contemplated as being provided with indicating means for signalling a component failure. The indicating means could be an audible alarm or indicator light. The lock could be energized by a low-power, low-voltage DC system such as a transformer-rectifier used to power video games. Additionally, the system could employ a low voltage AC electrical power supply. In either case, the voltage would be on the order of 9 to 12 volts. The low voltage and low power makes the system much safer from electrical shock and should not require any special Underwriter Laboratory's approval or building code approval. It is contemplated that on new construction houses the locks could be built into the door frames near the door handle rather than being made part of the moving door. This design would eliminate the complication of powering a lock on a swinging door. For existing houses, it is possible to power replacement locks by using a pair of electronic contacts on the door and door frame that form a mating connection when the door is shut. Another possibility for existing homes would be to make the locks self-powered so that they would not require any wire connections. This would be accomplished by fitting a small electrical generator within the door and actuated by the door handling. In addition to the wired power supply, the lock mechanisms may also be powered by small, long-life batteries. To obtain the maximum lifetime performance from a battery powered lock it would be necessary to add an actuating device on a doorknob or near the door that would be activated so as to power the locking mechanism for a predetermined time period after the actuating device was touched. After this lapsed time, the lock would then automatically cut off the battery power supply so as not to consume any more electrical power until the actuating device was again activated. So as to warn the user that battery life was coming to an end, the lock could be designed to make an audible tone when there was less than a predetermined number of additional possible activations without changing the battery. Of course, it is realized that the main drain on the battery of such a lock mechanism would be to accomplish the mechanical function of latching and unlatching the lock rather than driving the photodetector and the processing electronics. So as to minimize this battery drain, it is contemplated that the energy required to unlatch the locking mechanism would be mechanically stored in a spring that is compressed when the lock is closed. Then only a small amount of electrical power would be required to move a miniature solenoid that would trip the spring and in turn unlatch the locking mechanism. Alternatively, the mechanical energy to unlatch the locking mechanism could be derived from the turning force on a doorknob or handle. In either case, the concept is to design a locking mechanism that uses a very small amount of electrical energy to trigger some substantially larger source of mechanical energy so as to perform the unlatching function. If one desired to open the door in the case where a small electrical generator is employed, the handle would be first moved to generate sufficient electrical energy, stored in a capacitor, to make the lock operative for a predetermined time. The wristwatch is then used to transmit the code to the lock in the manner described below. Additionally, with today's technology for outdoor applications, the lock may be designed to be powered by a small solar cell that is incorporated in the lock. Of course, some capacitive or rechargable battery storage would be required so that the lock would be functional at night.

To guard against malfunctions of the lock due to a power failure, it is desirable to have some conductor points exposed on the outside of the lock that could connect to a temporary battery to reactivate the lock. Such connections need not be obvious; they can be any two metal parts such as the base of the doorknob and the frame surrounding the optical port.

The universal electronic system may also be used in hotels or other multiple rental units that are controlled from a central desk. The desk clerk would have access to each door lock by a data link such as wire pairs, optical fibers, etc. that permits entry or erasure of a code or resetting the lock so that the next code entered will be added to the lock's temporary memory. When a guest registered for a room the desk clerk would assign the guest a room number and advise the guest that he has just reset the door lock so that it will be activated by the next code received by the guest's watch transmitter. In a case where the guest does not yet have a transmitter, an inexpensive unit having a minimum of features can be assigned to him for the duration of his visit in the same manner that a key is presently assigned. In addition to the remote reset features just described, the door lock can also be designed so that another code, in addition to the guest code, can be added or deleted from the individual lock memory without interfering with the guest's code. This would permit a maid to gain entry into the room. As is to be understood, all codes could be changed from the front desk at convenient intervals. Carrying the concept of remote setting of a lock code further, in certain secure areas a lock may be remotely set in a programmed fashion for many different authorization situations. For example, a lock can be set to allow access only during 8AM to 5PM working hours, or a code that might open a bank safe at 9AM on January 2nd may be rejected on January 3rd. This mode of operation would be useful in banks and other financial institutions, government agencies, storerooms, data files, etc. An additional useful feature is that actuated locks may report the actuation code to a central process for future reference. An example would be the actuation of a lock to use an office copying machine. Reporting the code could be useful in subsequent charging for service.

The invention also contemplates the use of a handheld or wrist worn "repeater" device for users of the universal electronic locking system. The repeater would have a photodetector and memory similar to a lock as well as a signal transmitting unit. The repeater would be of convenience when passing an individual's code to someone else. For example, if an automobile equipped with the universal electronic locking system is left with a repair shop, the appropriate code from an individual's signal transmitting unit could be transmitted to a repeater device that would be used by the repair shop's staff. Two types of repeaters are contemplated by the invention: one would have a digital display of the received code and be used for diagnostics by lock repair men and the other would have no display at all and would be commonly used in garages, hotels, etc., as described above.

It is also recognized that in the transition period before the universal locking system becomes broadly accepted, locks could be provided which can be actuated by both keys and the optical activation system contemplated by the disclosure.

DETAILED DESCRIPTION OF THE PREFERRED EMBODIMENTS

Figure 1:
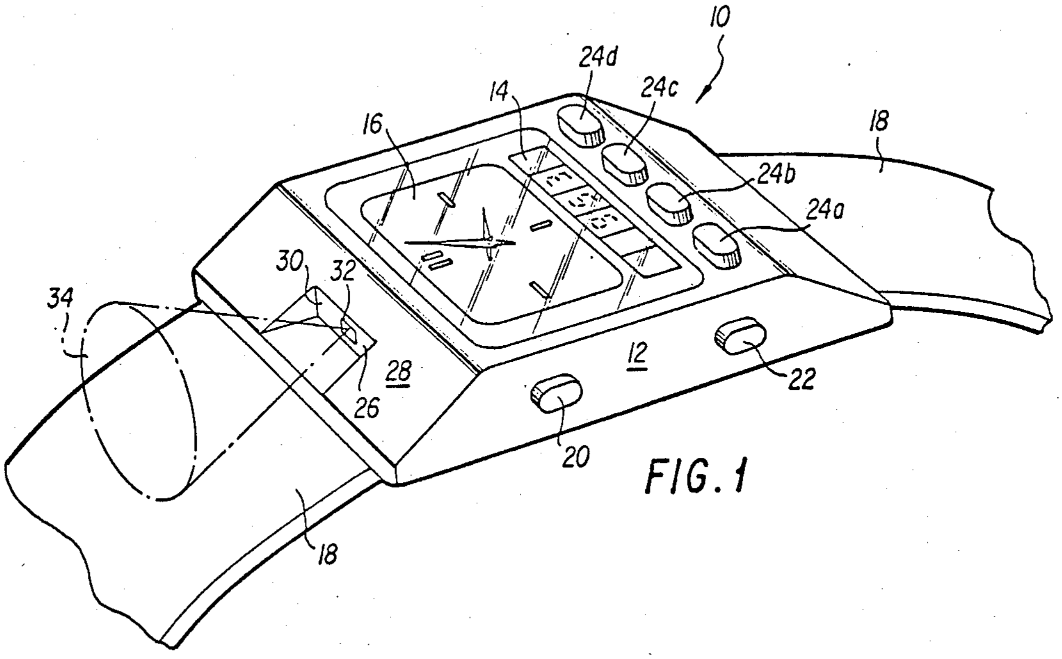
FIG. 1 is a representation of the lock actuating signal transmitting unit incorporated into an electronic wristwatch.

Referring to FIG. 1, the signal transmitting unit, indicated generally at 10, is incorporated in an electronic wristwatch 12 which is provided with a digital display of time 14 and an optional analog time display 16. The watch is shown attached to a wristband 18 but it is to be understood that the band is optional and that the device could well be incorporated into a pocket, pendant on pencil watch or watches which would be worn in various other ways. The electronic watch would be provided wtih a time reset or display illuminator indicated at reference numeral 20 and a function control key for time and code reset as indicated at 22. The function control key for time reset would function in the well known manner of any electronic watch and the function for code reset will be explained in more detail below. Additionally, the watch is provided with a plurality of code keys at 24 which transmit a preset coded signal from the watch to a signal-receiving unit for unlatching the lock mechanism to be described below. It is noted that while four code keys are shown, various numbers of code keys could be provided so as to transmit an actuating signal to the latching means of the signal receiving unit for controlling the latching mechanism for various locking systems such as at the home, office, recreational areas and automobiles.

Figure 1A:
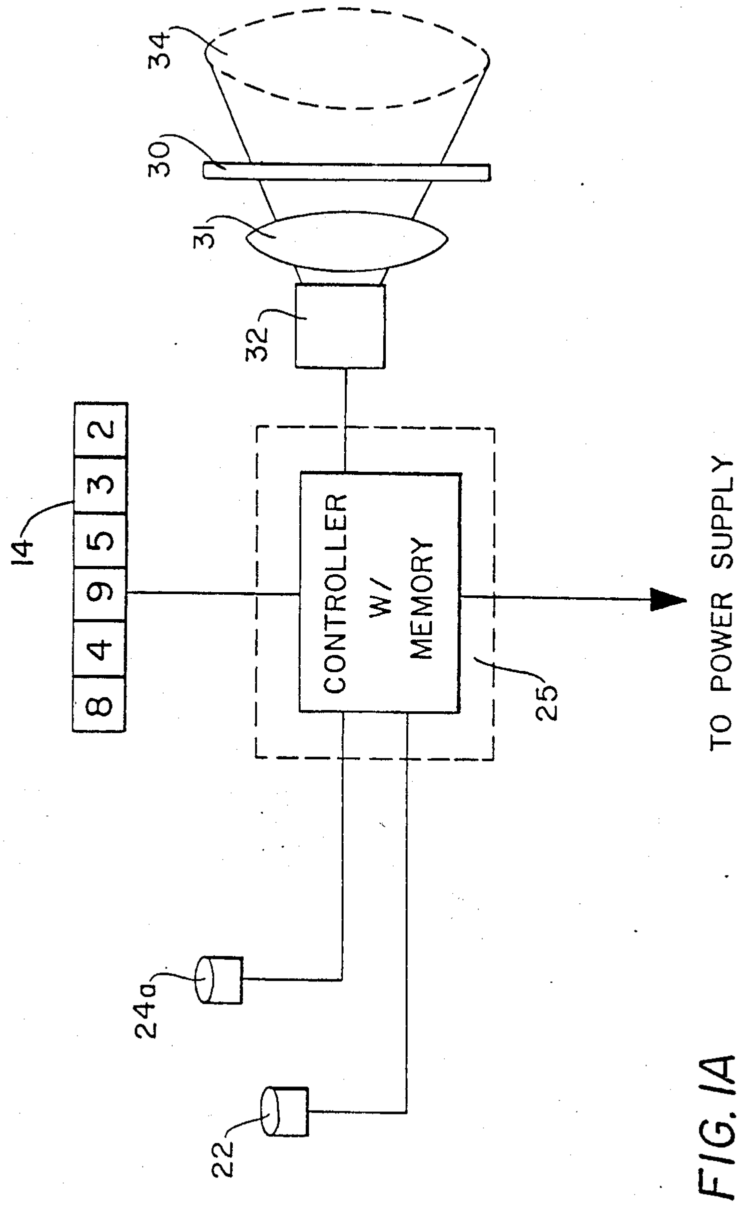
FIG. 1A is a further representation of the lock actuating signal transmitting unit depicted in FIG. 1.

A port 26 is provided in the top, end face 28 of the watch. The port provides a window 30 for the light source 32 contained in the watch. As previously discussed, this light source may be one of various types which may be powered by the battery and electronic circuitry contained within the electronic watch. Reference numeral 34 indicates the light-emission pattern from the light source and clearly shows the cone-type projection previously discussed. The cone-type emission pattern 34 from the light source 32, contained in the watch, transmits the coded optical signal through the air to a photodetector contained within the signal receiving unit discussed below. The top location of part 26 is convenient for the user so he can visually align the emission pattern 34 towards the receiver by sighting in the 12 o'clock direction. Regardless of the number of code keys 24, each may be preset to a desired numerical sequence code in much the same manner that the time or date is presently set into an electronic watch. The code keys 24 are located, for convenience, on the lower front edge of the watch 12. They can be depressed by the user's index finger without interfering with the visual alignment of the emission pattern 34. The separate function control key 22, on the side of the watch, is sequentially depressed to reset time, data and possibly some alarm time. The control key 22 would then be sequentially depressed again so as to control or indicate a code key 24 which is to receive a locking key. For example, if the first code key 24*a* is to be reset, the function control key 22 is depressed until a "Cd 1" appears on the watch's digital display. The symbol "Cd" would be an abbreviation for the term "code". Once this occurs, the user will note that he is in the mode to reset a new code by use of the code key 24*a*. Upon the appearance of the "Cd 1", a multidigit code of, for example, six digits, can be entered by depressing the code key 24*a* causing the next digit on the display to sequentially roll until the code key 24*a* is released. The sequential roll would be through the digits 1, 2, 3, 4, 5, 6, 7, 8, 9 and 0 until the code button is released. Upon release of the code key 24*a*, the digit which is shown in the digital display would be stored in the memory of the electronic watch. The same code key 24*a* would then be depressed again until the second digit is selected from the rolling display discussed above. Again, upon releasing the code key 24*a*, the indicated digit is then committed to the memory unit provided in the electronic watch. This process is repeated until the entire six digit code is entered. Referring to FIG. 1A, it is seen that the logic functions required to enter the code and subsequently activate the light source, upon command, are all integrated into a silicon integrated circuit chip 25 which also contains the function systems of the electronic watch.

FIG. 1A also shows the disposition of lens 31 in front of the light source as previously described. A six digit code is selected so as to enhance the security of the locking system, since the probability of a random coincidental activation would be one in a million. This would provide excellent security against unauthorized opening of the latching unit in the signal-receiving unit. The process for setting a code just described, would be repeated for each of the code keys 24*b*, 24*c* and 24*d* with each code key requiring, in the example given, a six digit number. Of course it is to be understood that the number of digits embodied in the code could vary depending upon the degree of security required in the locking system and the memory capability contained within the silicon integrated circuit chip. The transmission code format for activating the light source is selected to be effective and efficient. An example of such a format would be to convert the six digit code into a binary bit sequence that is transmitted in a Frequency Shift Key (FSK) format. While this is but one example, the invention is not to be considered so limited and other formats may be utilized.

In a further embodiment of the invention, one of the code keys 24 could be adapted as a fixed code key which, when depressed, would cause a standard emergency signal to be transmitted which would be received by any standard emergency receiver in the area. Alternatively, the transmitter could be designed so that the standard emergency code would be transmitted when two or more code keys 24 are simultaneously depressed. Thus, the fixed "emergency" code key function would enable a person to signal for emergency assistance in situations where it was not possible to reach a telephone such as during a robbery or unexpected incapacitating illness. The intensity of the emergency signal could be much greater than a key code transmission to cover a greater distance to an emergency receiver.

Figure 2:
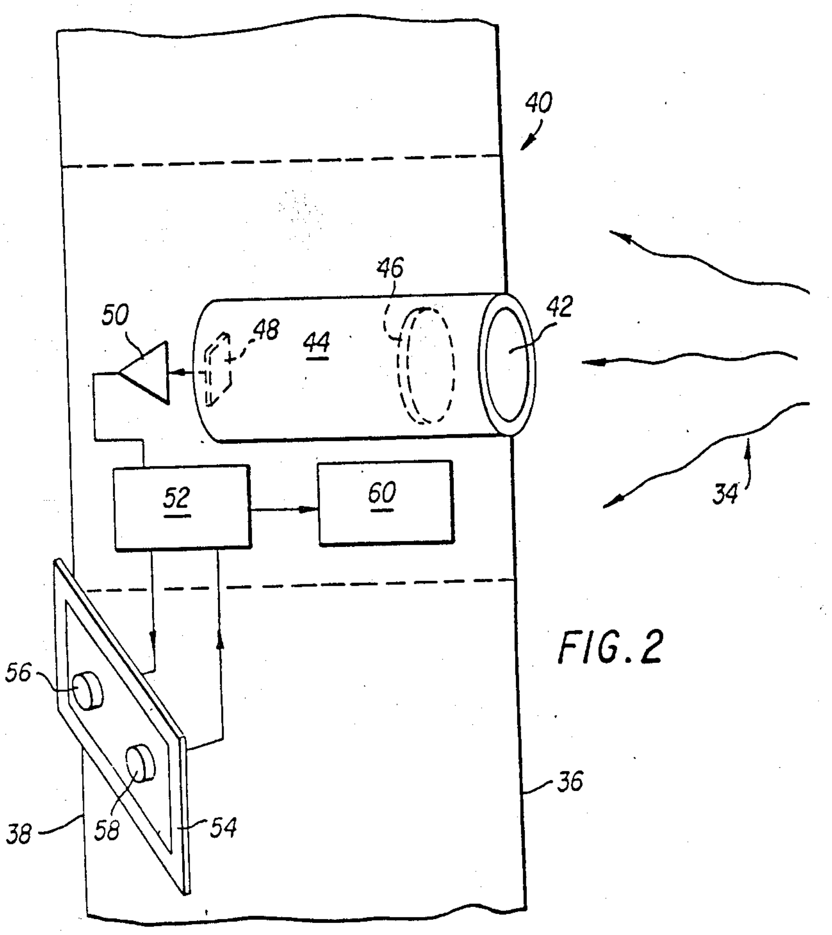
FIG. 2 is a representation of a lock actuating signal-receiving unit and latching mechanism contained within a door or door frame.

FIG. 2 discloses the details of the signal-receiving unit which is located in a door or door frame. The system is indicated generally by reference numeral 40. Also, for purposes of illustration and explanation only, the side of the door frame 36 is considered to be on the outside of the door or enclosure and reference numeral 38 indicates the interior of the enclosure to be protected by the locking system 40. Reference numeral 42 indicates the window of a photodetector structure indicated at reference numeral 44. A pass band filter, indicated at 46, is situated between the window 42 and the silicon photodetector 48. The filter is designed to reject substantially all ambient light except the light in the emission band 34 of the light source 32 in the signal-transmitting unit 10. This considerably improves the sensitivity of the photodetector 48 by eliminating undesirable background light which would cause noise in the detected signal. It is also within the scope of the invention to have the photodetector 48 substantially recessed behind the protective window 42 and have the walls of the tubular cavity 44 leading to the photodetector 48 covered with an optically absorbing material. In this case, a light from the signal-transmitting unit would pass straight through to the photodetector 48 while only a small fraction of the ambient light would have rays that would follow essentially the same path to the photodetector 48. An alternative receiving structure may employ an optical fiber to relay a portion of the signal transmitted from the light emitter to the photodetector. A band pass optical filter placed either in front or after the fiber would be beneficial to reject background light. The use of a fiber relay is particularly beneficial in situations where the lock mechanism may be a substantial distance from the point where access is desired. For example, a fiber optic relay would be useful for opening a garage door without requiring an automobile operator to get out of his vehicle to establish close proximity to the lock mechanism. Downstream of the photodetector 48 is an amplifier 50 which serves the usual function of amplifying the detected signal before transmission to the signal processor 52.

Located in the interior 38 of the enclosure desired to be locked is a programmable memory unit 54 provided with two control keys 56 and 58. The control key 56 may be actuated to operate the unit and the control key 58 may be actuated to program the memory unit. When the program control key 58 is actuated, the next code received by the photodetector will be entered in a non-volatile electronic memory chip within the memory unit. In this instance, the term "non-volatile" means that the code will be retained in the memory unit even if electrical power is temporarily lost. The most common type of "non-volatile" memory is the well known electronically programmable read only memory (EPROM). These silicon chips allow the user to load a limited number of bits into a non-volatile memory. Once a bit is loaded, however, it can never be changed, although the bit can be ignored and a new bit can be electronically entered. In time, the memory capacity of the EPROM, typically 4,000 to 64,000 bits, will be fully consumed and the chip becomes unusable. This type of memory would be satisfactory for the signal transmitting and receiving units of the invention because a typical six digit code requires only twenty bits of memory capacity. With a 4,000 bit EPROM, the codes could be changed up to 200 times while the larger capactiy EPROMs would accommodate 3,200 code changes.

More recently, there has been developed electronically erasable programmable read only memory (EEPROM or $E^2$PROM) which can be reused, but thus far these chips have been found to operate too slowly to be used as the main memory in the signal transmitting and receiving units of the invention.

Even more recently, non-volatile random access memories (NVRAMs) have been developed that combine a conventional high speed volatile memory with a back-up $E^2$PROM that is loaded with the volatile memory data in case of a loss of power. Such NVRAMs are manufactured by Intel Corporation under the designation 2004. Although the memory capacity of the 2004 is substantially in excess of the capacity needed, the NVRAM technology is the preferred choice for use in signal transmitting and receiving units of the invention.

A still further way to insure that memory is not lost due to a power failure is to include two power sources in all transmitters and receiving units. One power source would function as the primary power source while the second would function as a back-up power source that would be automatically cut in if a low voltage signal was sensed in the primary source. An audible alarm can be included in each unit to alert the user of the failure of the primary power source when the transmitting or receiving unit is activated.

When a new code is desired to be entered in the signal-transmitting unit 10, it is entered in the manner previously described. In order for the signal-receiving unit to be responsive thereto, the control key 58 is actuated and the new code is transmitted to the memory unit 54 and entered in the memory chip. The control key is then deactuated so as to deny access to the memory unit. When the operating key 56 is then actuated, and the code which was previously transmitted and stored in the memory of the memory unit 54 is received by the photodetector, the processor will automatically compare the received code with the one stored in the memory. If the codes are identical, the processor 52 will instruct the electromechanical latch 60 to open and allow ingress to the enclosed area 38.

Accordingly, a significant feature of the electronic lock system is that locks can be designed to be opened by a multiplicity of different codes. All valid codes may be entered in a fashion similar to that described above and stored in the memory unit 54. When a code is received in the memory unit 54 and the unit is in the operate mode, the processor would compare the received code with all valid codes that were previously entered in the memory unit 54. If the received code matches any one of the codes contained in the memory unit, the electromechanically operated latch 60 would be operated and opened by the processor 52. Of course, the memory unit 54 and access keys 56, 58 would be covered by a plate, not shown, when not in use.

The above-described multi-code operation is particularly desirable for locking systems that are used by a large number of people. For example, many members of a club may use their private codes to open the same lock at a shared clubhouse. This would greatly reduce the number of code keys required on each individual's watch. Additionally, all locks will fall into two categories, i.e., single code locks and multi-code locks. The single code locks will be the least expensive and their memory units will have only the two operators 56, 58 previously discussed. The multi-code locks will have three or four operators for programming the memory unit 54 to receive a code from memory, putting the latching means in an operating mode, deleting codes from the memory unit and possibly for clearing all codes. While the multi-code lock is not illustrated, it is clearly within the concepts of the invention.

In some instances it may be desirable to include a single random code in an unalterable read only memory (ROM) at the time of manufacture to preclude the possibility of having to destroy a lock to open it if the lock were inadvertently secured and the operating code lost. The single random code would not be disclosed to the purchaser, installer or anyone else coming in contact with the lock, but would be retained by the manufacturer. Thus, the lock could be opened after the manufacturer satisfied itself that the party requesting the code was entitled to receive it to open the lock.

Figure 3:
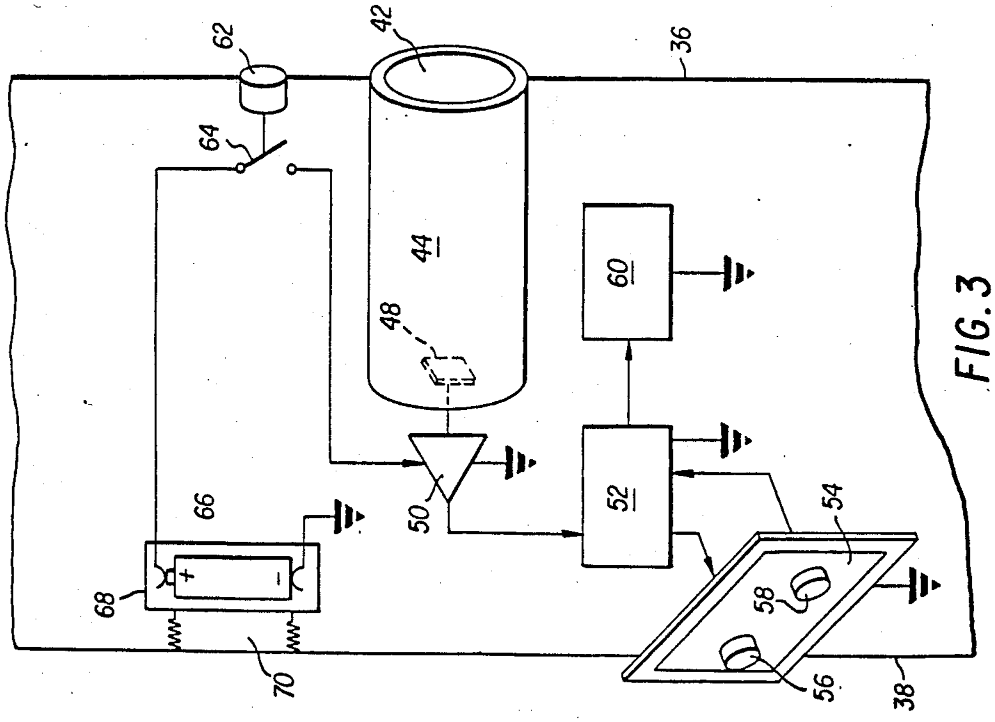
FIG. 3 is a representation of another lock actuating signal-receiving unit and latching mechanism contained within a door or door frame.

FIG. 3 depicts a further embodiment of the signal-receiving unit illustrated in FIG. 2 having a secondary, self-contained electrical system in case of failure of the primary system. In the event of failure of the primary electrical system, activator button 62 is depressed, which closes switch 64 thereby connecting the secondary power source 66 to the primary system through amplifier 50. The secondary power source is typically a battery. The battery is housed within a compartment 68 in the same enclosure as the primary system which is provided with removable cover 70 for battery replacement.

Figure 4:
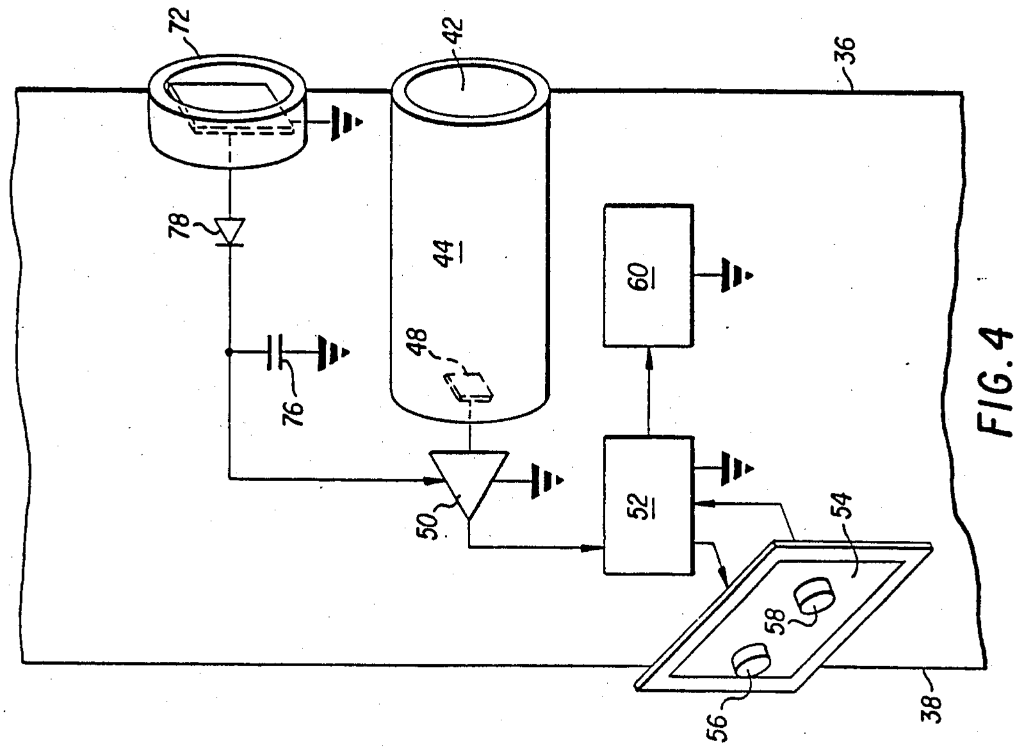
FIG. 4 is a representation of a solar powered lock actuating signal-receiving unit and latching mechanism contained within a door or door frame.

A solar powered signal-receiving unit is shown in FIG. 4. Sunlight enters the unit through solar port 72 and is received by solar cell 74, which transforms the solar energy into electrical energy to power the system. Capacitor 76 or a rechargable battery is provided to store the electrical energy so that the system can operate in periods of darkness or low light. Diode 78 is provided between the solar cell and the capacitor to prevent the charge stored in the capacitor from discharging through the solar cell during dark periods.

Figure 5:
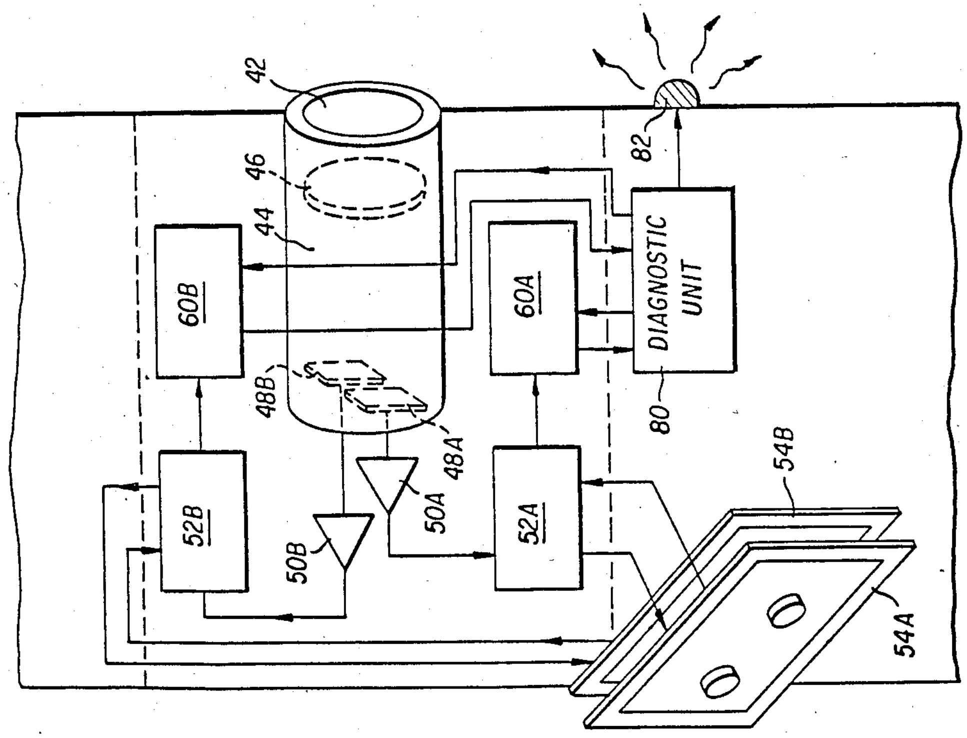
FIG. 5 is a representation of a lock actuating signal-receiving unit and latching mechanism contained within a door or door frame and having redundant components and component failure signalling means.

FIG. 5 illustrates a signal-receiving unit containing redundant components as a safeguard against failure of the primary components. In this unit the primary components are labelled with reference numeral "A" and the redundant components with the corresponding "B" reference numerals. In addition, the unit contains diagnostic unit 80 connected to both the primary and redundant systems. If either electro-mechanical unit 60A or 60B receives an instruction to open, it will report this to the diagnostic unit 80. In normal operation, the diagnostic unit will receive simultaneous signals from both electro-mechanical units 60A and 60B. In the event of a component failure, the diagnostic unit will only receive one signal from either unit 60A or 60B. This will trigger the diagnostic unit to actuate alarm 82 as well as the unactuated electro-mechanical unit so that the lock may be opened.

Figure 6:
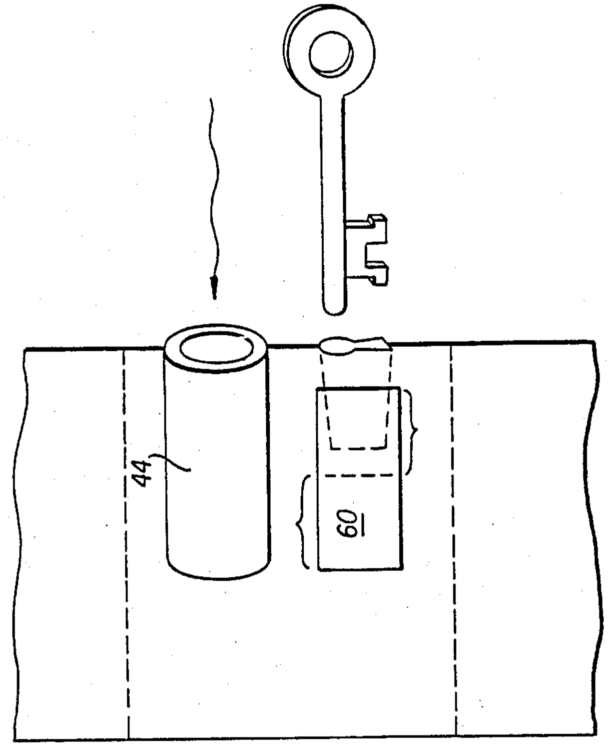
FIG. 6 is a representation of a lock actuating signal-receiving unit and latching mechanism contained within a door or door frame which can be actuated by both optical signal and key.

FIG. 6 shows an embodiment of the invention in which the signal receiving unit is modified so that the lock may be opened by a key. The key is designed to activate the electro-mechanical unit 60 which opens the lock. Further details regarding specific embodiments of this concept are discussed below in relation to FIGS. 9–11.

Figure 7:
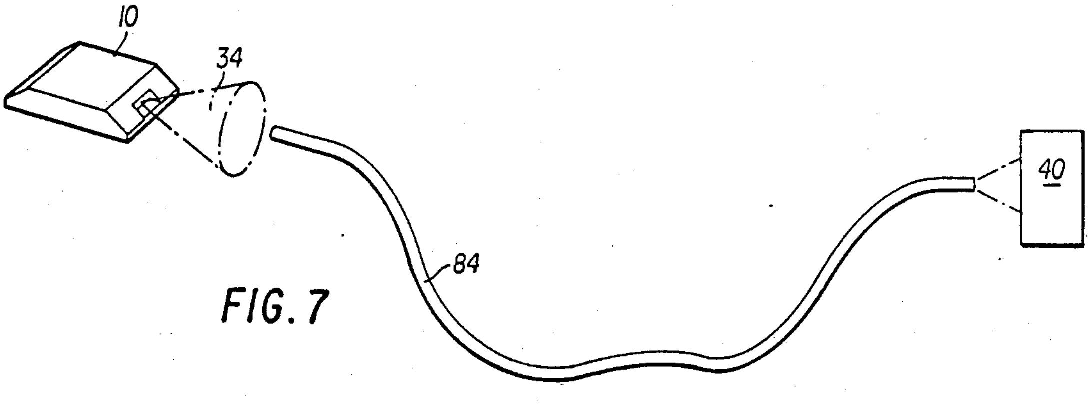
FIG. 7 is a representation of a fiber optic transmission link for transmitting different encoded signals.

FIG. 7 shows a typical fiber optic transmission relay for use in conjunction with the invention. The relay is comprised of optical fiber 84 which receives the optical signal which is emitted from the transmitting unit 10 in a coneshaped pattern 34. At the other end of the optical fiber, the optical signal exits the fiber in the same cone-shaped pattern and is received by optical receiver in the lock actuating signal-receiving unit 40.

Figure 8:
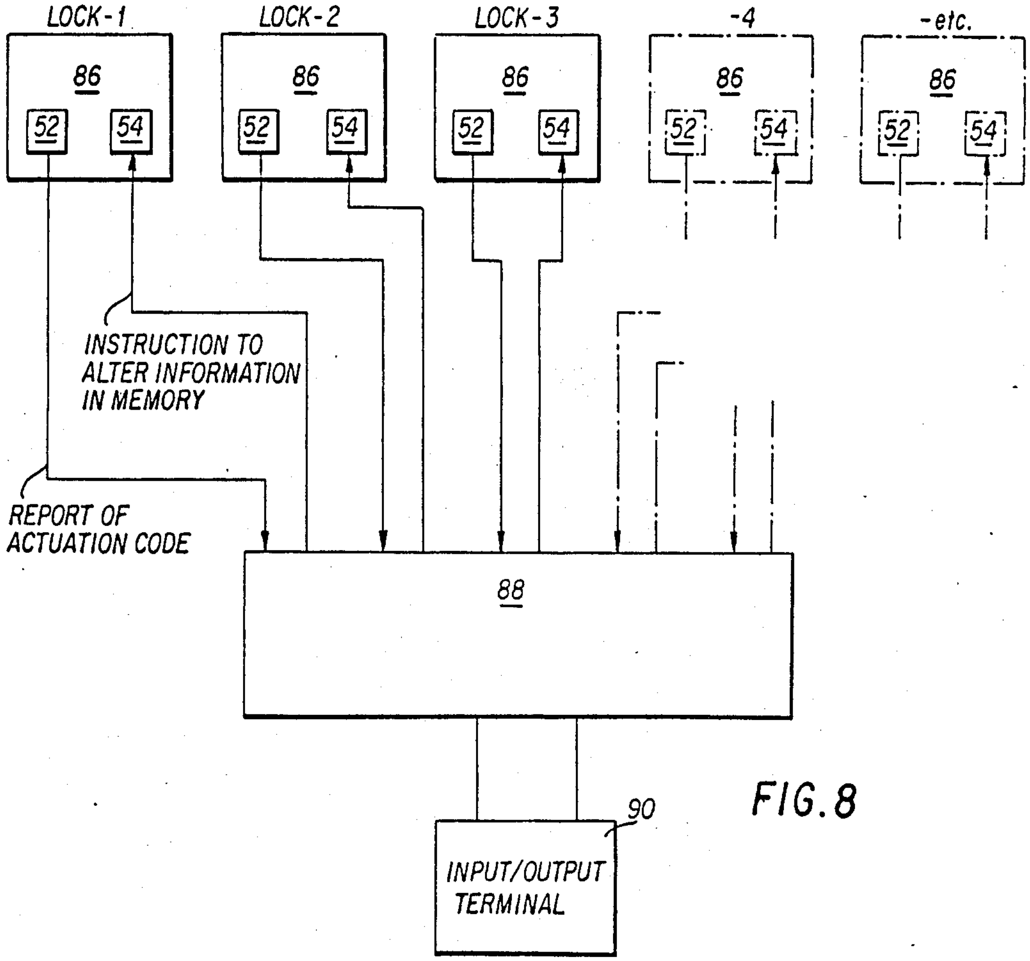
FIG. 8 is a representation of a group of remote lock actuating signal-receiving units and latching mechanisms which report actuation to a central processor.

Finally, FIG. 8 shows a further embodiment of the invention in which a plurality of remote locking units 86 are connected to a central processor 88. In this manner, each remote locking unit can be continuously monitored and controlled by the central processor. As previously described, this embodiment is particularly useful in hotels or other multiple unit structures since it permits individual control of each locking unit from a central location using a data input/output terminal 90. In this same manner, each remote lock can be connected to a central security system. For example, upon receipt of a valid code by a lock, a signal is relayed to a central processor which automatically deactivates the security system for the premises. However, unless the security system is deactivated in this manner, an alarm is sounded and transmitted to the appropriate security personnel when the lock is opened.

Figure 9:
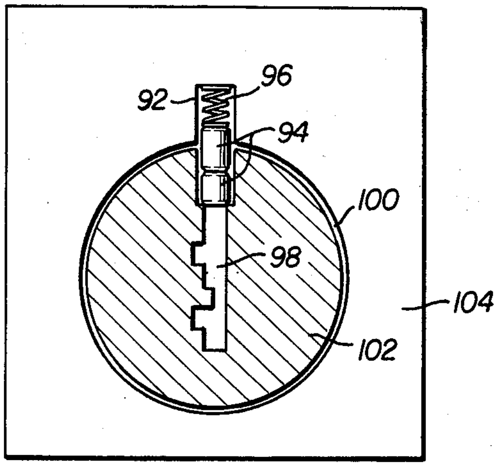
FIG. 9 is a representation of a cross section of a conventional key activated lock.
Figure 10A:
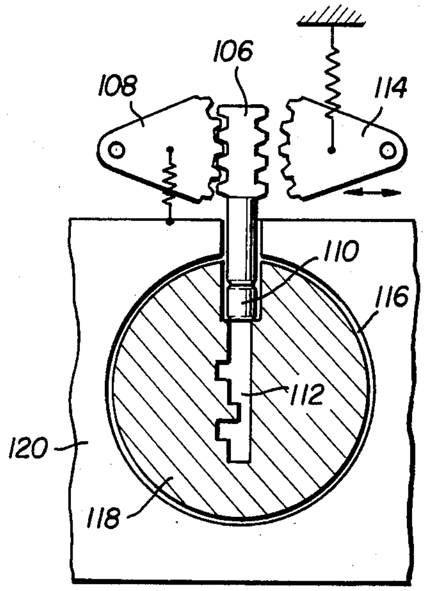
FIG. 10A is a representation of a cross section of a conventional key activated lock adapted to be activated by an optical signal.

FIGS. 9, 10A and B and 11 illustrate specific embodiments for dual mode locking systems, activated by either an encoded optical signal or a standard key.

FIG. 9 shows a cross section of a standard lock activated by a key. The lock has a vertical row of openings 92, generally four to six, each containing two small pins 94 referred to as tumblers and a spring 96. When the correct key is inserted into key slot 98, the pair of tumblers is pushed up against the spring so that the parting line between the two pins is positioned at the annular space 100 formed between the cylinder 102 and the fixed housing 104. Tumblers of various lengths are chosen so that the key must have a particular profile to simultaneously lift all locking pins to position the parting line in annular space 100. When this is accomplished, the key can be turned and the cylinder 102 will rotate within fixed housing 104. In turn, a mechanical linkage (not shown) will open the latch.

To modify such a lock to be activated either by a transmitted encoded optical signal or by a key requires special design considerations. For example, the design must permit the unlatching function activated by the transmitted optical signal to perform independently of the cylinder operation. Otherwise, an optical signal and key would be required to open the lock.

Figure 10B:
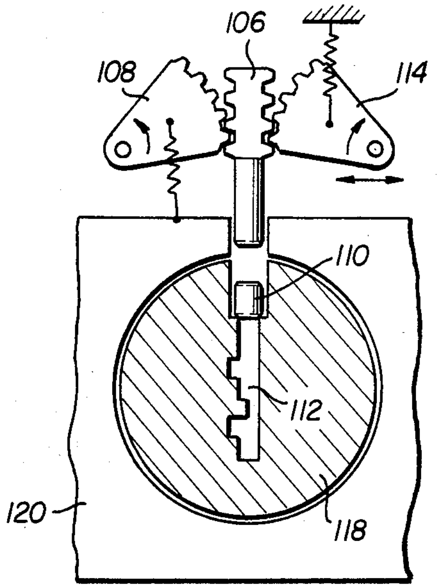
FIG. 10B is a representation of a cross section of a conventional key activated lock also adapted to be activated by an optical signal.

FIGS. 10A and B depict one way to accomplish independent activation of the unlatching function by a transmitted optical signal. During idle periods the lock is configured as shown in FIG. 10A. The upper locking tumblers 106 are still spring loaded by a series of gripping means or cams 108 to bear down on the lower tumblers 110. If a key is inserted in this lock through key slot 112, it functions in a conventional fashion. However, if a valid optical code is received by the lock, another cam or comparable gripping means 114 swings in to engage all upper tumblers 106, as shown in FIG. 10B, and lifts them above the annular space 116 between the cylinder 118 and fixed housing (not shown). The cylinder 118 is then free to rotate even though the lower tumblers have not moved.

In cases where the lock is dependent upon battery power for its operation, the receipt of a valid optical code by the signal receiving unit causes the lock to be opened by an internal battery driven escapement mechanism, e.g., a small pin, lever or wheel, which causes a chain sequence of mechanical parts to move under the hand power of rotating the doorknob or an auxiliary knob. This chain sequence is designed to minimize battery drain in accomplishing the escapement function by taking full advantage of human power in performing the unlatching. During the chain sequence gripping means 114 first swings in to engage the upper tumblers 106 and lifts them. The final step in the mechanical sequence is the rotation of the cylinder, also accomplished by human power.

Figure 11:
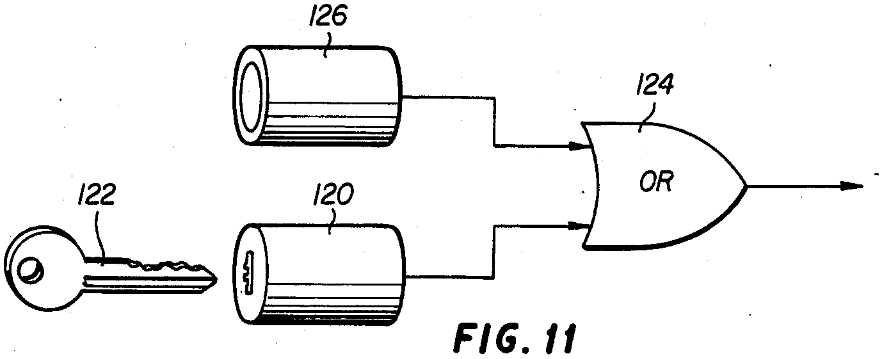
FIG. 11 is a representation of a locking mechanism having dual unlatching capacity which employs electronic rather than mechanical parts.

FIG. 11 depicts a further mechanism for providing the dual unlatching capability in accordance with the invention, employing an electrical switch rather than a series of mechanical parts. In this embodiment, an electronic switch lock 120 is activated by key 122 and issues an electronic signal indicating that the lock is to be opened. Such electronic switch locks are well known in the art and have been extensively used in automobiles. The electronic switch lock is connected to an OR gate 124 which also is connected to the signal receivig unit of the optically activated lock mechanism 126. The OR gate transmits an electronic signal to unlatch the lock upon receipt of a signal from either the electronic switch lock 120 or the signal receiving unit 126.

As indicated previously, an important aspect of this invention is the recognition that many elements already included in typical electronic watches, such as the digital display panel and some function operations, can be used for the dual purpose of telling time and opening locks. Of course, it is recognized that the invention may be incorporated into other electronic devices which include many of the functions and integrated circuitry of the modern, electronic watch. State-of-the-art reliability in present day solid state electronics, including optical emitters and photodetectors, makes the electronic locking system more reliable, secure and convenient than present mechanical locking devices.

While the invention has now been described in terms of certain preferred embodiments, the skilled worker in the art will recognize that there are various changes, omissions, modifications and substitutions which may be made without departing from the spirit thereof.

I claim:

1. An electronically actuated locking system comprising a signal transmitting unit energized by a self-contained power source; said signal transmitting unit comprising light-emitting means, a first controller which actuates said light-emitting means so as to transmit an encoded optical signal to a signal receiving unit, said first controller including a first programmable memory unit for storing data corresponding to a plurality of different encoded signals and means for entering said data into said first memory unit, said signal receiving unit comprising a photodetector for receiving said encloded optical signal, means for comparing said received encoded signal to one or more codes contained in a second programmable memory unit capable of storing data corresponding to a plurality of different encoded signals, means for entering said data into said second memory unit and means for deactivating a lock mechanism when said received encoded signal matches one of said one or more codes contained in said second memory unit.

2. An electronically actuated locking sytem as defined in claim 1, wherein said signal receiving unit further includes a non-programmable memory unit responsive to a single encoded signal so as to deactuate said lock mechanism when said single encoded signal is received by said signal receiving unit.

3. An electronically actuated locking system as defined in claim 2, wherein said memory units are nonvolatile memory units.

4. An electronically actuated locking system as defined in claim 1, wherein said lock mechanism can be deactuated by an encoded optical signal or by key means.

5. An electronically actuated locking system as defined in claim 4, wherein said lock mechanism is deactuated by an encoded optical signal received by said signal receiving unit or by a key activated electronic switch.

6. An electronically actuated locking system as defined in claim 1, wherein said second memory unit is programmable by an encoded optical signal transmitted by said signal transmitting unit.

7. An electronically actuated locking system as defined by claim 1, wherein said second memory unit is programmable by means other than said signal transmitting unit.

8. An electronically actuated locking system as defined by claim 7, wherein said means for programming said second memory unit comprises a data link controlled from a central location.

9. An electronically actuated locking system as defined in claim 8, wherein said data link is connected to second memory units in a plurality of signal receiving units.

10. An electronically actuated locking system as defined by claim 8, wherein said data link is connected to a central processor and transmits each actuation of said lock mechanism to said central processor for recordation.

11. An electronically actuated locking system as defined by claim 10, wherein said central processor records said encoded optical signal received by said signal receiving unit.

12. An electronically actuated locking system as defined by claim 10, wherein said central processor deactivates a security system upon receipt of said transmission of actuation of said lock mechanism.

13. An electronically actuated locking system as defined by claim 1, wherein each of said one or more encoded signals can be transmitted to said signal receiving unit.

14. An electronically actuated locking system as defined by claim 1, wherein said first memory unit is programmable so that each of said one or more encoded signals stored in said first memory unit can be reset to provide one or more different encoded signals in said first memory unit.

15. An electronically actuated locking system as defined by claim 1, wherein said first memory unit contains a fixed emergency signal which upon transmission from said signal transmitting unit is capable of being received by any of a plurality of receivers within receiving distance of the signal transmitting unit.

16. An electronically actuated locking system as defined by claim 1, wherein said signal transmitting unit contains digital display means for displaying digits and/or letter characters identifying an encoded signal when the data corresponding to said encoded signal is entered into said first programmable memory unit.

17. A method of operating an electronic locking system including a signal transmitting unit which transmits an encoded optical signal to a signal receiving unit, comprising the steps of:

(a) entering and storing data corresponding to a plurality of encoded signals in a programmable memory unit of a signal transmitting unit;

(b) entering and storing data corresponding to one or more encoded signals in a programmable memory unit of a signal receiving unit capable of storing data corresponding to a plurality of different encoded signals;

(c) emitting a light beam modulated with said encoded optical signal from said signal transmitting unit in response to actuating a controller;

(d) receiving said encoded optical signal in said signal receiving unit;

(e) comparing said receiving encoded signal to one or more codes contained in a programmable memory unit of said signal receiving unit; and (f) unlocking latching means when said received encoded signal matches a code contained in said memory of said signal receiving unit.

18. The method as defined in claim 17, further comprising converting said encoded signal into a digital bit stream and transmitting it in a frequency shift key format to said signal receiving unit.

19. The method as defined in claim 17, further comprising programming said signal transmitting unit so that a plurality of different encoded signals can be transmitted by said signal transmitting unit.

20. The method as defined in claim 17, further comprising programming said memory unit of said signal receiving unit with a plurality of different codes which correspond to a plurality of different encoded signals.

21. The method as claimed in claim 17, further comprising providing a time delay in said signal receiving unit after a predetermined number of received signals fail to match one of the codes contained in the memory unit of said signal receiving means.

22. The method as defined in claim 17, further comprising operating said latching means by an electromechanical device; providing a primary power supply for actuating said electromechanical device; providing a secondary power supply for actuating said electromechanical device and actuating said secondary power supply upon failure of said primary power supply.

* * * * *